Oct. 27, 1959
G. E. KEEFER
2,910,194
APPARATUS FOR BLANKET CHARGING GLASS BATCH IN A GLASS FURNACE
Filed Dec. 10, 1956
4 Sheets-Sheet 2
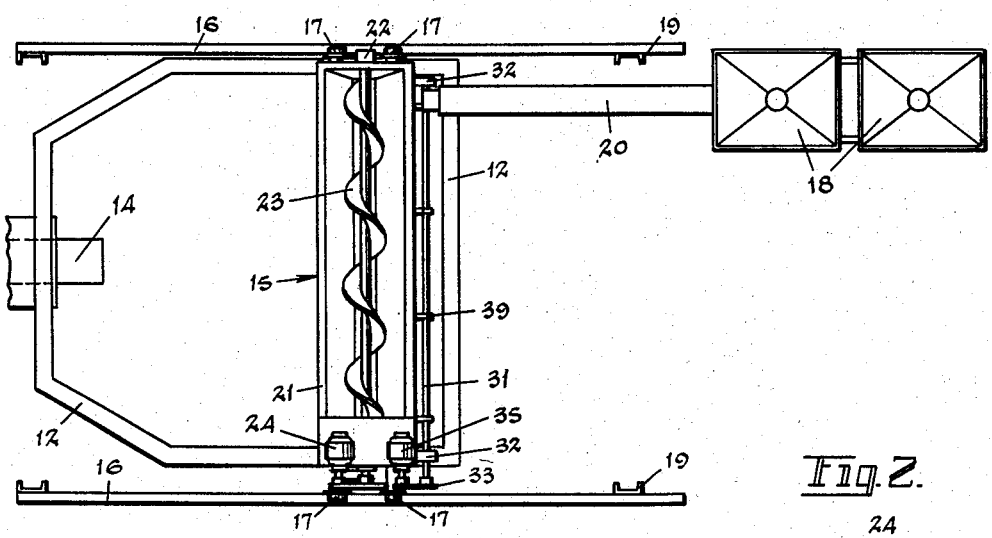
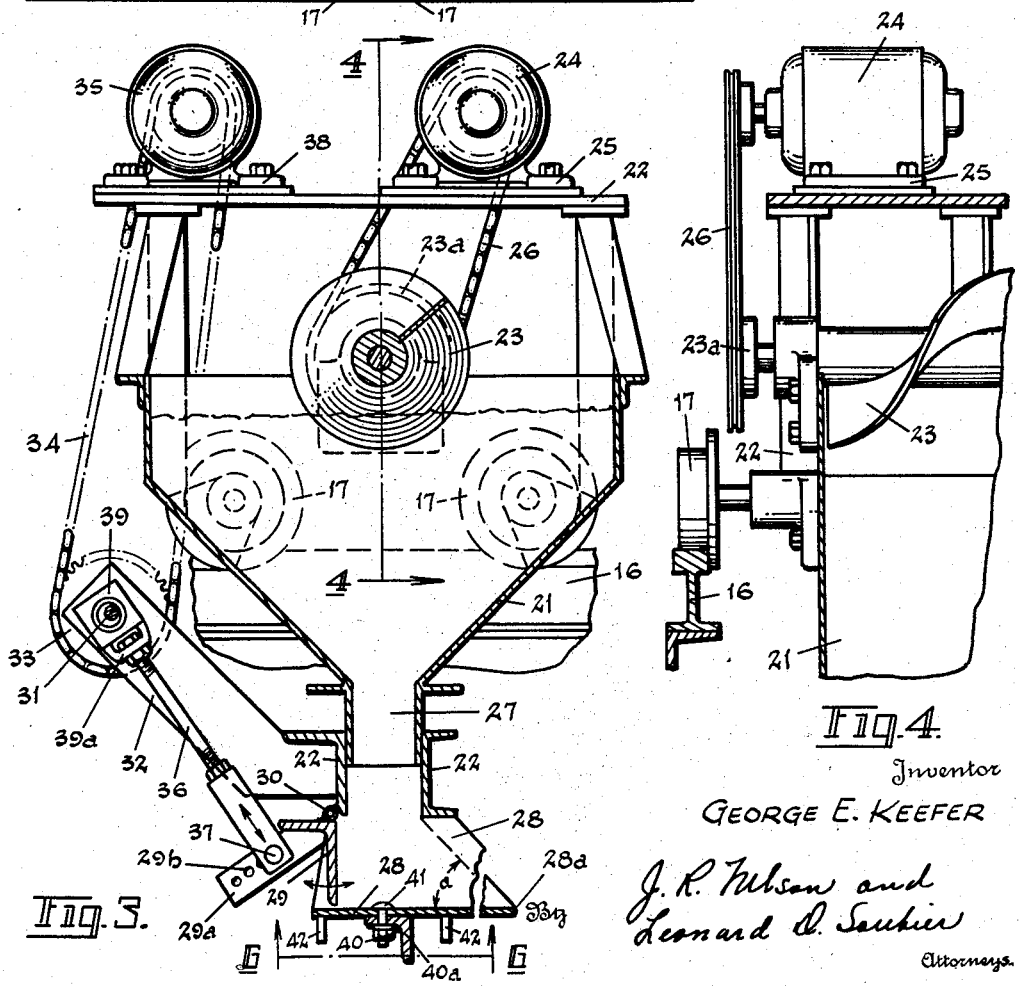
Inventor
GEORGE E. KEEFER

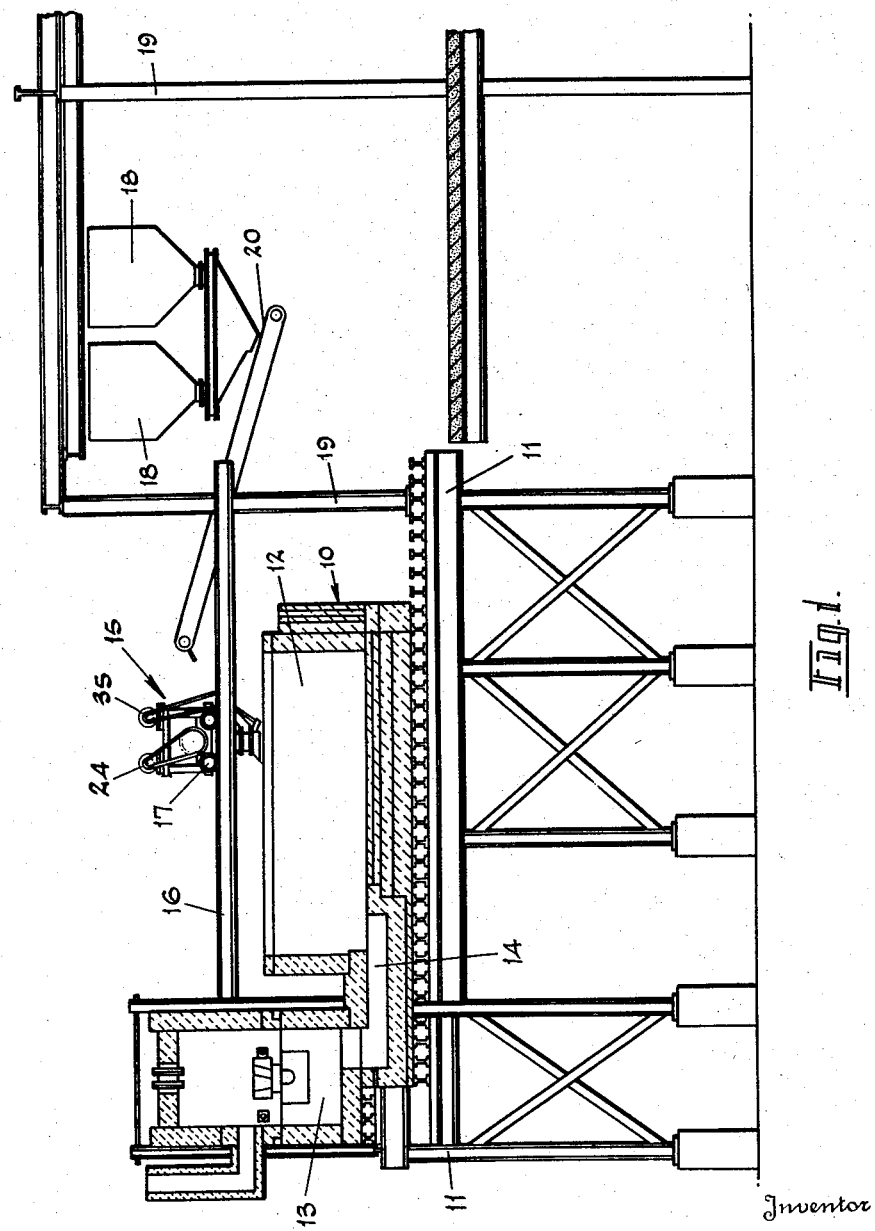

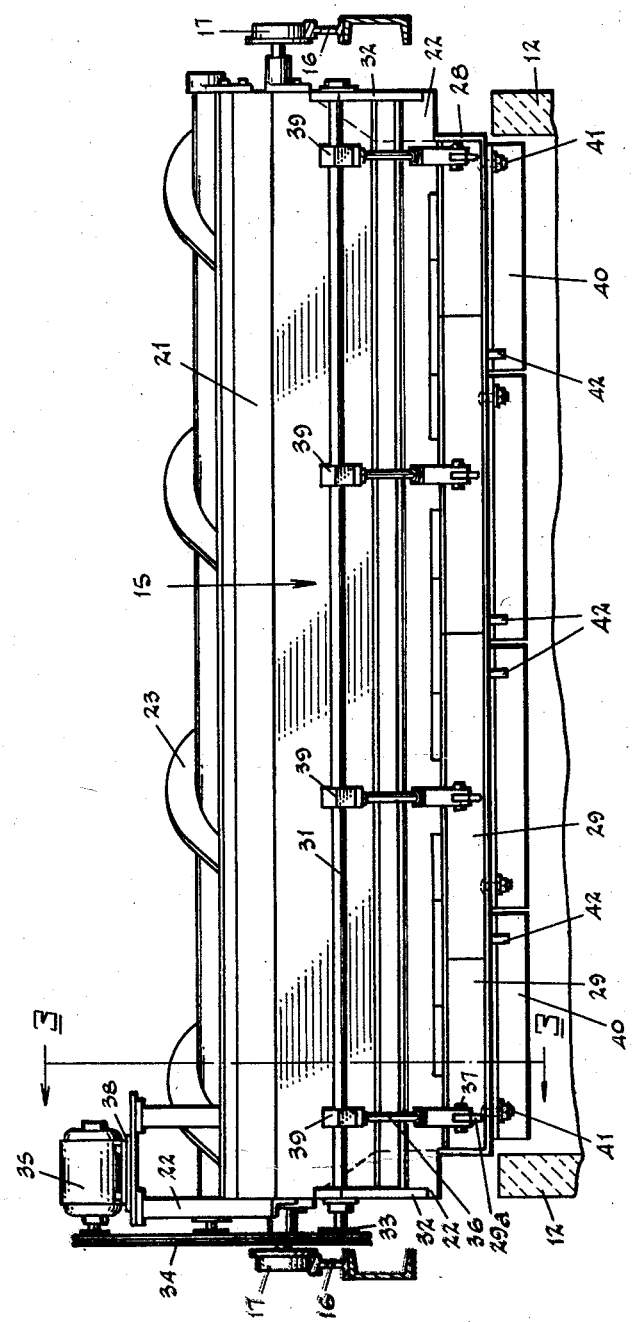

Oct. 27, 1959 G. E. KEEFER 2,910,194
APPARATUS FOR BLANKET CHARGING GLASS BATCH
IN A GLASS FURNACE
Filed Dec. 10, 1956 4 Sheets-Sheet 4

Inventor
GEORGE E. KEEFER
By J. R. Nelson and
Leonard D. Saubier
Attorneys

United States Patent Office 2,910,194
Patented Oct. 27, 1959

2,910,194

APPARATUS FOR BLANKET CHARGING GLASS BATCH IN A GLASS FURNACE

George E. Keefer, Toledo, Ohio, assignor to Owens-Illinois Glass Company, a corporation of Ohio Application December 10, 1956, Serial No. 627,353

10 Claims. (Cl. 214—18)

This invention relates to a batch feeder apparatus utilized in blanket charging raw batch materials into a glass furnace; and more specifically, to charging a level blanket of batch materials over the top of an electric open-top glass melting furnace.

In the conventional electric glass melting furnace or tank, a melter chamber is connected to a refiner chamber by a throat passage. Molten glass is fed to forming machines from the refiner chamber through one or more feeder boots or forehearths. The glass batch is spread over the top surface of the molten glass contained in the melter in the form of a heat retaining blanket covering the molten glass body. Heat is applied to the molten glass body by electrical resistance heating. The heat of the liquid body melts the adjacent portion of the batch blanket to maintain the necessary operating level of molten glass in the furnace.

The levels of molten glass contained in the refiner and adjoining feeder boots are equal, however, due to the hydraulic-piston effect of the batch blanket on the liquid body of glass in the melter, the liquid level of the glass in the melter is below that in the refiner. These separate levels of glass throughout the furnace will vary depending upon the amount of the batch that is being supported by the molten body in the melter.

The working glass is discharged at a feeder orifice located below the level of glass in the feeder boot. The rate of discharge of the working glass determines the volume of glass in each working charge or gob and is determined by the viscosity and fluid head of the glass in the feeder. Therefore, the size of the working charge of glass issued from the discharge orifice is regulated, for a given viscosity, by the level of glass maintained in the feeder. Since this critical level of glass in the feeder is dependent upon the depth of the blanket of batch existing in the melter chamber, the desired rate of discharge of the molten glass to the forming machinery for manufacture of commercial ware is dependent upon the rate at which batch is charged to said blanket.

Previously, batch feeder devices have employed a gravity-discharge type feeding hopper which extends across one dimension of the open-top of a furnace and made to move back and forth along the other dimension of the melter, discharging its batch contents during travel. The hopper must necessarily be recharged with batch material at some point during the back and forth travel and for this purpose its movement is interrupted periodically. During filling of the hopper as well as all other times, the batch materials are supported by the batch blanket.

Several disadvantages are inherent in the use of such a gravity-feed hopper, namely: (1) A small area of the batch blanket must have sufficient supporting strength to hold most of the weight of the batch in the hopper while the device is kept stationary, and if the batch blanket yields under this weight, a large portion of the hopper load may break through at that area of the batch blanket, causing an immediate rise in the level of glass in the feeder and an increase in the size of the working charges of glass being fed to the forming machinery, (2) more batch is often fed than is required, and thus, the glass level in the furnace cannot be accurately controlled, (3) more batch is often fed over one part of the blanket than another, and (4) movement of the hopper may cause movement of the batch blanket and the glass under it.

To remedy one or more of the above disadvantages, water is sometimes added to the batch blanket to add to its strength and stability. This is undesirable due to the resultant formation of gases within the batch, which may permeate to the glass body in the melter.

The characteristic temperature differential and melting rate between the areas adjacent the vertical walls of the melter and the central melting zone causes the batch materials of the blanket to melt more rapidly near the central melting zone than near the walls of the melter. Consequently, the need for batch is greatest at the horizontal central portion of the melter.

It is, therefore, an object of this invention to provide apparatus for blanket charging glass batch over the top of a glass melter which will overcome the above disadvantages.

Another object of this invention is to provide apparatus for blanket charging glass batch over the top of a glass melter controlled as a function of the melting demands of the furnace and, in so doing, will maintain a level surface layer of batch in the melter.

Another object of the invention is to provide apparatus for blanket charging batch to an open-top glass melter, whereby the rate of feeding batch is variable across one dimension of the melter to compensate for the non-uniform melt of batch between the central zone of the melter and its side zones along that dimension.

Another object of the invention is to provide a feeder apparatus with a plurality of movable discharge assistance which permit variation of the batch feeding rate longitudinally along the batch discharge dimension of the feeder.

The specific nature of the invention, as well as other objects and advantages thereof, will become apparent to those skilled in the art from the following detailed description, taken in conjunction with the annexed sheets of drawings, on which, by way of preferred example only, is illustrated an embodiment of this invention.

In the drawings:

Fig. 1 is a side elevational view of a glass melting furnace to which the batch feeder apparatus of this invention is applied.

Fig. 2 is a plan view of the batch feeder apparatus, shown in operating position over the top of the glass melter.

Fig. 3 is an end view of the apparatus taken along lines 3—3 of Fig. 5.

Fig. 4 is a fragmentary sectional view taken along lines 4—4 of Fig. 3.

Fig. 5 is a rear elevational view of the batch feeder apparatus of this invention.

Figure 6:
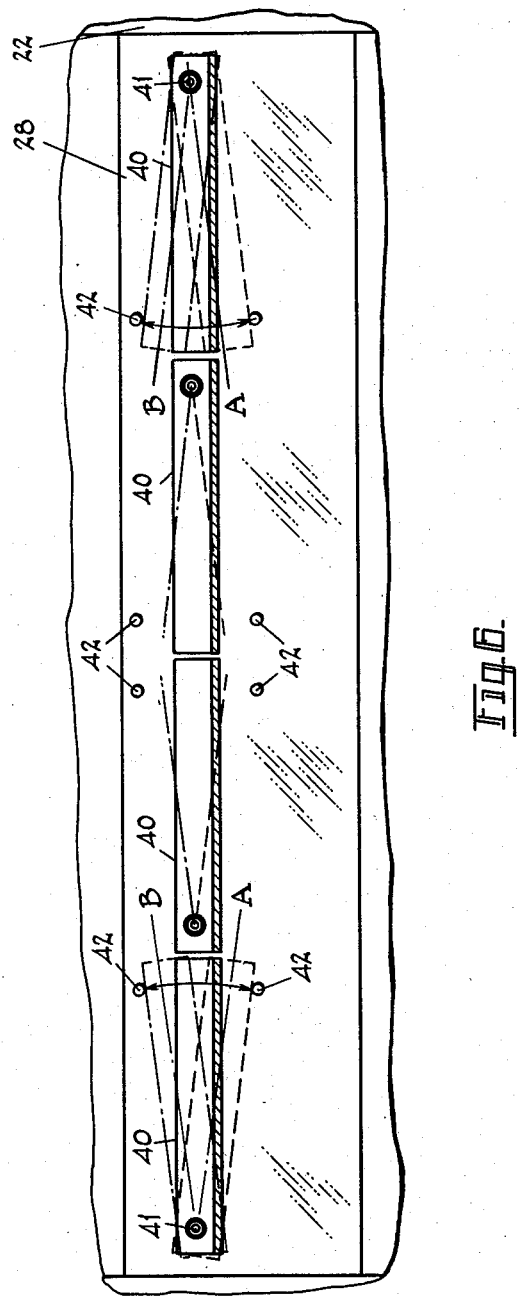
Fig. 6 is a bottom view of the discharge plate of the feeder apparatus taken along line 6—6 of Fig. 3, showing the positioning of the batch grader elements.

Fig. 1 illustrates a standard glass furnace, referred to generally at 10, supported on a structural base 11, and comprises a melter chamber 12 communicating with a refiner chamber 13 through a throat passage 14. A feeder hopper assembly 15 is supported on tracks 16 over the top of melter 12 and assembly 15 is adapted for movement longitudinally of melter 12 on rollers 17 traveling along tracks 16. Rollers 17 are propelled along tracks 16 by a conventional constant speed device (not shown) which reverses direction at each longitudinal end of melter 12. It is timed to stop or dwell periodically at the end of melter 12 opposite throat passage 14 and there load the hopper of assembly 15 with a fresh supply of batch. Spaced from the outer end wall of melter 12 are batch bins 18 supported on structural columns 19. Bins 18 are utilized to store raw batch materials for transfer to feeder hopper assembly 15 by conveyor 20. The hopper of assembly 15 is loaded while stationary at its extremity of travel to the right hand side of Fig. 1.

Referring now to Figs. 2–5, it is seen that the feeder hopper assembly 15 comprises an elongated funnel-shaped hopper 21 supported by a frame 22 mounted on rollers 17. Longitudinally of the hopper 21 is a screw element 23 mounted for rotation therein. An electric motor 24 is mounted on a bracket 25 at one end of hopper frame 22, and drives screw 23 through belt 26 and pulley 23a (Fig. 4) to distribute the batch uniformly throughout the length of hopper 21.

The lower funnel portion of hopper 21 is housed between longitudinal members of frame 22 and has a discharge opening 27 to permit gravity feeding of batch material contained in hopper 21 onto an elongated discharge lip member 28 rigidly mounted on frame 22 below discharge opening 27. Discharge lip member 28 receives and supports batch material in hopper 21 and has sufficient width (Fig. 3) so that, as batch material is discharged from hopper 21 onto lip 28, the angle of repose of the batch supported thereon (angle $a$) will prevent the batch from spilling over the discharge extremity 28a of lip member 28. Along the one longitudinal edge of lip member 28 is mounted a plurality of discharge assistants for moving batch off of lip member 28. As shown, these discharge assistants are illustrated as a plurality of reciprocating blade elements 29 pivoted about a longitudinal pivot axis 30 overlying lip member 28 and along the side at the lower end of discharge opening 27 of hopper 21. A lever arm extension 29a is provided integral on each of blade members 29 and extends outwardly of opening 27. Shaft 31 is journaled at its ends in brackets 32 mounted on hopper frame 22 so that it is parallel to and overlying blade members 29. Pulley 33 is keyed to the end of shaft 31 for imparting rotation transmitted from a variable speed motor 35 and chain belt 34. Motor 35 is mounted on frame 22 by bracket 38. The variable speed feature of motor 35 is utilized to vary the total feeding rate of the discharge assistants, which will be hereinafter described more fully. A plurality of connecting rods 36 are each pivoted at one end on pins 37 in their respective lever arms 29a of blade members 29 at pins 37. Pins 37 are carried in selected hole 29b of a series of such holes along each lever arm 29a, and are readily removable for adjusting the connection of connecting rod 36 to lever arm 29a. Adjacent the other end of connecting rod 36 is provided an eccentric journal member 39 clamped about shaft 31 journaled into a bearing assembly 39a. The end of connecting rod 36 is threaded onto U-shaped bracket portion of bearing assembly 39a. Connecting rod 36 has a threaded adjustment to adjust its length when changing the lower connection to lever arm 29a between holes 29b. Likewise, the throw of the eccentrics are adjustable by providing eccentric journal members 39 of various radii, which are assembled in split fashion and easily changed after unthreading at U-clamp 39a.

During operation of the feeder hopper assembly 15, motor 35 drives shaft 31 in one direction. The rotation at shaft 31 is converted to reciprocal motion at blade member 29 through the action of eccentric 39 and connecting rod 36 on lever arm 29a. The length of stroke of the reciprocating motion of a given blade member 29 is adjustable by varying its point of connection to connecting rod 36 along the length of its lever arm 29a or by changing the through of eccentric 39, or both.

In the figures is shown an arrangement of four driving connections 39, 36 and 37 for reciprocating blade members 29. It is contemplated by this invention that the centrally located blade members 29 be reciprocated through a longer stroke motion than the two outer members 29, thereby varying their effective rate of discharging batch material from lip member 28. This variation is adjustable to compensate for the increased demand for batch in the central zone of the melter.

This invention also contemplates placing eccentrics 39 on shaft 31 such that they are out of phase one with the other (90 degrees successively out of phase is preferred where four blade members are used) in order to equalize and reduce the driving load placed on motor 35 during rotational driving cycles of shaft 31, and additionally, to lessen bearing load on shaft 31, thereby prolonging the life of the supporting bearings.

Referring to Figs. 3, 5 and 6, a plurality of angle-shaped elongated grader members 40 with a vertically projecting blade 40a are pivoted in a horizontal plane about vertical pins 14 extending through discharge lip member 28. Pins 41 lie longitudinally in line along lip member 28, so that the grader members 40 are pivoted nearer their outwardly extending ends (Fig. 6). Such arrangement of four grader members 40 are shown on the drawings, but any number may be provided as may prove most convenient. The grader members 40 are free to pivot in either direction between the limits defined by projecting lugs 42 longitudinally spaced along a line on either side of pivot pins 41, so that, when the feeder hopper assembly 15 moves toward throat passage 14 (to the right in Fig. 3 and upwardly in Fig. 6), the respective grader members 40 pivot away from the linear direction of travel of hopper assembly 15. Thus, in Fig. 6, as the grader elements come in contact with piles of batch during travel of hopper assembly 15, the grader members 40 pivoted on the left side of discharge lip member 28 will angle clockwise from their pivot pins 41 and grader members 40 on the right side of said member 28 will angle counterclockwise from their pivot pins 41 until each respective blade member 40 engages its respective lug 42. Thusly, any projection of batch above a predetermined level along the upper surface of the batch blanket contained in the melter will be shifted from the outer lateral portions of the batch blanket toward its central portion under the grading action of the vertically projecting blades 40a. Similarly, raised portions at the ends of the batch blanket projecting above this level will be graded centrally of the blanket to fill in the central portion. This serves to level the top layer of the batch blanket after it has been laid on the top of melter 12. This same grading effect will be obtained when the feeder hopper assembly reverses travel direction, and in which case the respective grader members will angle in the opposite direction to rest against lugs 42.

Feeder hopper assembly 15 is reciprocally moved back and forth across one dimension of the furnace. During this time, motor 35 imparts reciprocating motion to blade members 29 to move batch material deposited on discharge lip member 28 over its discharge extremity 28a and lay a curtain of batch over the top of the melter. Along the length of discharge lip member 28 these discharge assistants (blade members 29) are feeding batch at a varying rate due to the variation in the length of reciprocating stroke of blade members 29. This variation in discharge rate is adjustable to compensate for the greater melting rate of batch near the central zone of the melter. By the adjustments described above, the discharge rate of batch from the feeder apparatus may be varied from one end of the discharge lip to the other to lay a curtain of batch on a level top surface transversely of the blanket in the melter. Also, the grader members cooperate to further level the batch blanket in the melter.

It will, of course, be understood that various details of construction may be modified through a wide range without departing from the principles of this invention, and it is, therefore, not the purpose to limit the patent granted

I claim:

1. A batch feeder for blanket charging an open-top glass furnace with raw glass batch material comprising a hopper extending across one horizontal dimension of said furnace, means for moving said hopper along the other horizontal dimension of said furnace, means at the bottom of said hopper defining an elongated discharge opening extending transversely across said one horizontal dimension of said furnace and adapted to support batch material supplied to it by gravity from said hopper, means in said hopper and operable for uniformly distributing batch longitudinally of said hopper, a plurality of shiftable batch feeding elements mounted in side-by-side relationship along said discharge opening and cooperable with said discharge opening to effect flow of batch therethrough, means for individually controlling the movements of said batch feeding elements, thereby permitting variation in the flow of the batch through the discharge opening as between the batch feeding elements to provide a non-uniform feeding rate throughout said one horizontal dimension of said furnace, and means for collectively controlling the rate of movements of said batch feeding elements.

2. A batch feeder for blanket charging an open-top glass furnace with raw glass batch material comprising a hopper extending transversely across the top of said furnace, means for moving said hopper along the other horizontal dimension of said furnace, means at the bottom of said hopper defining an elongated discharge lip extending transversely across said furnace, means operable in said hopper to supply batch in said hopper to said discharge lip uniformly throughout the length of the latter, a plurality of pusher elements shiftably mounted in side-by-side relationship along the length of said discharge lip for movement toward and away from the batch discharging edge of said lip and cooperable therewith to move batch off said lip, and individual driving means for respectively reciprocating said pusher elements, each of said driving means including means for adjusting the stroke of the corresponding pusher element, thereby permitting a non-uniform distribution of batch throughout said transverse dimension of said furnace.

3. Apparatus defined in claim 2, wherein the pusher elements each comprise a blade-like member pivotally mounted to the hopper on an axis overlying and parallel to said discharge lip.

4. Apparatus defined in claim 3, wherein the driving means comprises a lever arm on each of said blade-like members, a shaft rotatably mounted longitudinally on said hopper and spaced from said blade-like members, motor means operatively mounted for driving said shaft, a plurality of eccentrics spaced along said shaft and adapted to have varied eccentricities, a plurality of adjustable length connecting rods respectively interconnecting said lever arms and said eccentrics whereby the effective stroke of each of said blade-like members varies according to the length of its said connecting rod and the throw of its eccentric, and the said motor means is characterized by being variable in driving speed for regulating the total batch feeding rate.

5. A batch feeder for blanket charging an open-top glass furnace with raw glass batch material comprising a hopper extending transversely across the top of said furnace, means at the bottom of said hopper defining an elongated discharge lip extending transversely across said furnace and adapted to receive batch from said hopper at a uniform rate, a plurality of pusher elements shiftably mounted along the length of said discharge lip and cooperable therewith to move batch off said lip, driving means for respectively reciprocating said pusher elements, each of said driving means including means for adjusting the stroke of the corresponding pusher element, thereby permitting variation of the batch feeding rate across the transverse dimension of said furnace, and batch grader means carried by said hopper longitudinally thereof, said means being adapted to contact batch contained in the furnace at a point above a predetermined vertical level therein and grade amounts of said batch engaged by said grader means to thereby strike said batch at said vertical level and redistribute the batch for leveling the blanket thereof.

6. A batch feeder for blanket charging an open-top glass furnace with raw glass batch material comprising a hopper extending transversely across the top of said furnace, means at the bottom of said hopper defining an elongated discharge lip extending transversely across said furnace and adapted to receive batch from said hopper at a uniform rate, a plurality of pusher elements shiftably mounted along the length of said discharge lip and cooperable therewith to move batch off said lip, driving means for respectively reciprocating said pusher elements, each of said driving means including means for adjusting the stroke of the corresponding pusher element, thereby permitting variation of the batch feeding rate across the transverse dimension of said furnace, and batch grader means carried by said hopper longitudinally thereof, said means being adapted to contact batch contained in the furnace at a point above a predetermined vertical level therein to grade amounts of said batch engaged by said grader means from the side portions of the furnace towards its central portion.

7. Apparatus defined in claim 6, wherein the batch grader means comprises a plurality of elongated grader elements pivotally connected at the bottom of said elongated discharge lip along a line extending longitudinally thereof and adapted for limited rotation in either direction about said connection in a horizontal plane, and stop means associated with the bottom of said elongated discharge lip and spaced outwardly and transversely on either side from said pivotal connections to lie in the path of rotation of said elements, said last-mentioned means being adapted to limit the rotation of said elements in either direction.

8. A batch feeder for blanket charging an open-top glass furnace with raw glass batch material comprising a hopper extending transversely across the top of said furnace, means for moving said hopper along the length of said furnace, means at the bottom of said hopper defining an elongated discharge lip extending transversely across said furnace, screw means longitudinally disposed in said hopper and overlying said lip, said screw means being operable for supplying batch in said hopper to said lip at a uniform rate throughout the length of said lip, separate motor means for operating said screw means, a plurality of side-by-side pusher elements shiftably mounted along the length of said discharge lip and operable to move batch off said lip, driving means operable for respectively reciprocating all of said pusher elements simultaneously, said driving means including individual connections to each said pusher element, and means for individually adjusting the length of stroke of each of the pusher elements through their said connections, thereby permitting a non-uniform distribution of batch throughout the transverse dimension of said furnace, and means for collectively varying the speed of said driving means for varying the rate of reciprocation of said pusher elements.

9. The combination defined in claim 8, wherein said means for driving said pusher elements comprises a variable speed electric motor.

10. A batch feeder for blanket charging an open-top glass furnace with raw glass batch material according to a predetermined pattern of batch distribution throughout said furnace area onto the batch blanket therein comprising a hopper extending across the top of said furnace, means at the bottom of said hopper defining an elongated discharge opening extending across one horizontal dimension of said furnace, means mounting said hopper for movement along the other horizontal dimension of said furnace, a plurality of movable discharge assistants cooperating with said discharge opening to control the feed of batch therethrough by the extent of their movement and the rate at which they are moved, each of said discharge assistants being independently variable with respect to their extent of movement to determine its independent batch feeding effectiveness relative to the others, means enabling individually varying each of said discharge assistants to modify its individual batch feeding effectiveness and thereby regulate the batch being fed along the said one horizontal dimension of said furnace according to the predetermined pattern of distribution for that said dimension of the furnace, and means for collectively varying the rate of movement of all said discharge assistants and thereby regulate the batch fed along the said other horizontal dimension of the furnace according to the said pattern of batch distribution for that said dimension of the furnace.

References Cited in the file of this patent

UNITED STATES PATENTS

| | | |
|---|---|---|
| 1,037,480 | Hoeller | Sept. 3, 1912 |
| 1,176,878 | Bayton | Mar. 28, 1916 |
| 1,267,004 | Slick | May 21, 1918 |
| 1,267,005 | Slick | May 21, 1918 |
| 1,941,897 | Hiller | Jan. 2, 1934 |
| 1,943,635 | Still | Jan. 16, 1934 |